3,031,342
GRAPHITE IMPREGNATION METHOD
Francois Kertesz, Oak Ridge, and Henry J. Buttram, Knoxville, Tenn., assignors to the United States of America as represented by the United States Atomic Energy Commission
No Drawing. Filed Oct. 27, 1959, Ser. No. 849,126
2 Claims. (Cl. 117—169)

Our invention relates generally to a method for impregnating porous refractory articles with salts having a high melting point, and more particularly to a method for impregnating graphite with sodium fluoride.

Refractory materials are widely used in vessels for containing molten metals and salts at high temperatures. The porosity of some of these refractory materials impairs their utility as containment materials.

In the neutronic reactor art, refractory materials are used for the containment of molten metal and salt fuels, and where the refractory has good neutron moderating characteristics, it serves in the dual capacity of moderator and container. As in the purely containment application mentioned above, the utility of these materials is impaired because of their porosity. When a molten fuel seeps into a porous refractory material within the active portion of a neutronic reactor, several problems arise which are unique to the reactor art. First, the fissionable material in this portion of the fuel becomes unavailable for purification and recycling until the refractory material can be processed. Secondly, the deleterious neutron-absorbing fission products contained in the trapped fuel constitute a reactivity loss for which compensation must be made by the addition of more fuel. Thirdly, and most serious, the trapped fuel continues to take part in the reaction and can cause a destructive overheating of the moderator structure.

The pores on or near the surface of a refractory material can be filled with a salt having a melting point which is higher than the temperature of the molten material which is to be contained, and the porosity of the refractory is, thereby, markedly reduced. For example, the surface pores of graphite can be filled with sodium fluoride, thereby rendering the graphite capable of containing salts having a melting point lower than that of sodium fluoride.

Refractory materials can be impregnated with molten salts by immersing the refractory in the salt under pressure. However, if the salt is one which has a high melting point, impregnation in this manner is exceedingly difficult. Sodium fluoride, for example, has a melting point of 992° C. (1818° F.).

It is, therefore, an object of our invention to provide a novel method for impregnating porous refractory materials with salts.

Another object of our invention is to provide a method for impregnating porous refractory materials with salts at relatively low temperatures.

A further object of our invention is to provide a method for impregnating refractory materials with salts having high melting points, the impregnation being accomplished at temperatures lower than the melting point of the salt.

A still further object of our invention is to provide a method for impregnating graphite with sodium fluoride at temperatures lower than the melting point of sodium fluoride.

Other objects of our invention will become apparent from an examination of the following detailed description and the claims appended thereto.

In accordance with the principles of our invention, we provide a method for impregnating porous refractory articles with at least one salt having a relatively high melting point, which comprises contacting the article to be impregnated with a molten mixture of said salt and at least one relatively volatile salt for a time sufficient to insure penetration of the article. The penetrated article is then heated to drive off the volatile salt preferentially with respect to the high melting salt, and a high melting salt composed mainly of the high melting component is left within the pores of the refractory article.

The impregnation process which we provide is advantageous in that mixtures of volatile and non-volatile salts melt at temperatures far below the melting point of the non-volatile salt. Therefore, the impregnation can be accomplished at this low melting temperature and the subsequent heating step to drive off the volatile component of the salt mixture can be conducted at temperatures between the melting point of the salt mixture and the melting point of the non-volatile salt.

Preferably, the impregnating salt mixture is a binary system consisting of one high-melting, non-volatile salt and one volatile salt. However, ternary, quaternary and higher salt mixtures which contain at least one volatile salt may suitably be used.

Contacting of the refractory material and the salt mixture may be conducted in any convenient manner, such as by the use of vacuum, pressure, or combinations of both. One suitable method comprises immersing the refractory material in the molten salt mixture, under pressure, for a time sufficient to give the desired penetration. In preparing refractory materials for containment purposes, a penetration of approximately 0.25 to 1.0 inch is generally satisfactory.

The heating step of our process is preferably conducted in a vacuum to increase the rate of removal of the volatile components of the impregnating mixture. The temperature at which the volatilization is accomplished may be any temperature between the melting temperature of the molten impregnating salt mixture and the melting temperature of the non-volatile salt or salts which are to be left within the pores of the refractory article. Generally, the temperature at which the volatilization is carried out will be the maximum temperature at which the treated graphite article can be subsequently used.

Any porous refractory material can be treated by means of our process. Examples of such materials include graphite, beryllium oxide, and the various carbide refractory materials.

The high-melting-point salt or salts which are used to fill the pores of the refractory material must be chemically non-reactive with the refractory, and where the purpose of the impregnation is to improve the containment characteristics of the refractory, the salt must also be non-reactive with the material to be contained.

The volatile salt must be non-reactive with both the refractory and the high-melting-point salt. Examples of volatile salts include zirconium fluoride, zirconium tetrachloride, and thorium bromide.

Any mixture of a non-volatile salt with a volatile salt will provide an impregnating mixture which has a melting point lower than the melting point of the non-volatile salt and is, therefore, suitable for use in our invention. However, in order to provide the lowest impregnation temperatures possible, an eutectic mixture of volatile and non-volatile salts is preferred.

A single treatment of a refractory article by our process will materially improve the containment characteristics of the refractory by reducing its porosity. However, since a portion of the salt mixture, namely the volatile salt, is driven off in the heating step, it is impossible to completely fill the surface pores with one application of our process. Therefore, several treatments are desirable for most applications. Treatments subsequent to the initial treatment may suitably be conducted in the same manner as the initial treatment.

Our invention is particularly applicable to the impregnation of graphite with sodium fluoride to improve the containment characteristics of the graphite for the fused fluoride salt fuels that are disclosed in the co-pending application of the common assignee, Serial No. 600,639, filed July 27, 1956, in the names of C. J. Barton and W. R. Grimes for "Reactor Fuel Composition," and now U.S. Patent No. 2,920,024, issued January 5, 1960. When applied to graphite for the containment of these neutronic reactor fuels, our invention preferably comprises contacting the graphite with a molten eutectic mixture of zirconium tetrafluoride and sodium fluoride, and heating the contacted graphite to preferentially drive off the volatile zirconium tetrafluoride.

In order to describe our invention in still further detail, the following illustrative example is offered.

EXAMPLE

A sample of commercial dense graphite was immersed in a molten eutectic salt mixture containing 25.4 wt. percent sodium fluoride and 76.6 wt. percent zirconium tetrafluoride for 24 hours at 500° C. At the end of the 24-hour soaking, the sample was removed and heated under vacuum at a temperature of 800° C. for an additional 24 hours in order to remove the zirconium tetrafluoride. A chemical analysis of the resulting product revealed that the concentration of zirconium tetrafluoride in the material that remained in the pores of the graphite sample had been reduced to 5.95 wt. percent.

An untreated graphite sample and a graphite sample treated as described in the preceding paragraph were immersed in a molten neutronic reactor fuel mixture consisting of sodium fluoride, zirconium fluoride, and uranium fluoride for 24 hours at 600° C. Upon removal from the fuel mixture, the penetration of the two samples by the uranium contained in the fuel mixture was determined by means of an alpha counter. The following table gives the results of that test.

Table 1

| Sample | Alpha Counts Per Minute | | |
|---|---|---|---|
| | Surface | At Depth of 1/8" | At Depth of 1/4" |
| Treated | 4 | 3 | 1 |
| Untreated | 8 | 6 | 4 |

Since the number of alpha counts per minute is proportional to the amount of uranium present at the various depths given in Table I, the effectiveness of our invention is apparent.

The above examples were given for purposes of illustration only and should not be interpreted in a limiting sense. Our invention should be limited in scope only by the claims appended hereto.

What is claimed is:
1. A method for impregnating graphite articles with sodium fluoride, which comprises contacting said graphite article with a molten mixture of sodium fluoride and zirconium tetrafluoride for a time sufficient to insure penetration of said article by said mixture and elevating the temperature of said contacted article to drive off said zirconium tetrafluoride while leaving said sodium fluoride within the surface pores of said article.

2. The method of claim 1, wherein said molten mixture of sodium fluoride and zirconium tetrafluoride is of essentially eutectic composition.

References Cited in the file of this patent
UNITED STATES PATENTS

| | | |
|---|---|---|
| 585,993 | Wallace | July 6, 1897 |
| 894,845 | Mitchell | Aug. 4, 1908 |
| 1,806,589 | Espig et al. | May 26, 1931 |
| 2,414,514 | Elsey | Jan. 21, 1947 |
| 2,597,963 | Winter | May 27, 1952 |

FOREIGN PATENTS

| | | |
|---|---|---|
| 28,728 | Great Britain | of 1896 |